(No Model.)
E. B. HUNT.
CUTTER AND REAMER.
No. 308,842. Patented Dec. 2, 1884.
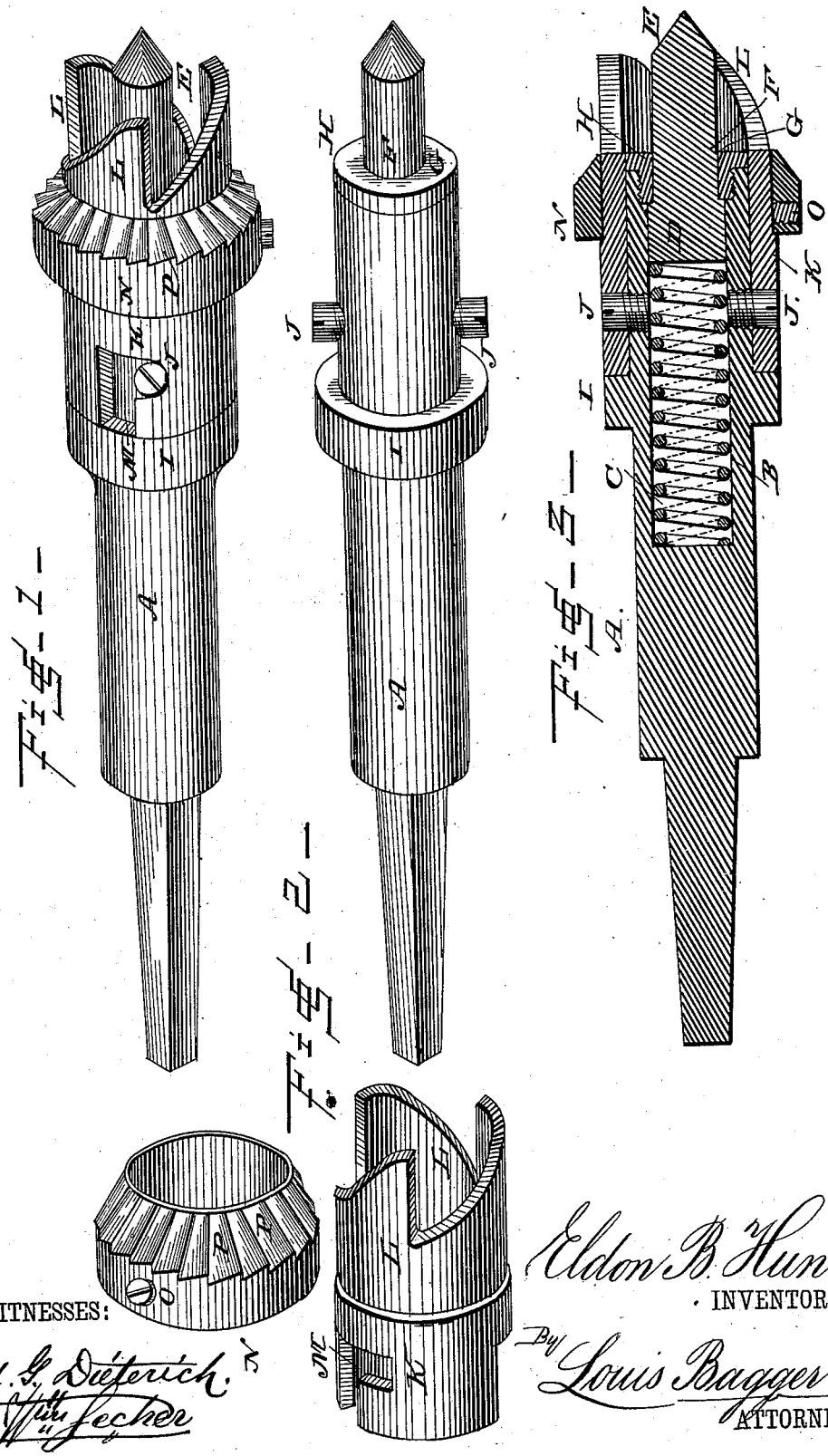

UNITED STATES PATENT OFFICE.

ELDON BROWN HUNT, OF DELAWARE, OHIO.

CUTTER AND REAMER.

SPECIFICATION forming part of Letters Patent No. 308,842, dated December 2, 1884.

Application filed April 19, 1884. (No model.)

*To all whom it may concern:*

Be it known that I, ELDON B. HUNT, a citizen of the United States, and a resident of Delaware, in the county of Delaware and State of Ohio, have invented certain new and useful Improvements in Flue-Sheet Cutters and Reamers; and I do hereby declare that the following is a full, clear, and exact description thereof, which will enable others skilled in the art to which it appertains to make and use the same, reference being had to the accompanying drawings, which form a part of this specification, and in which—

Figure 1 is a perspective view of my improved cutter and reamer for cutting holes in flue-sheets of boilers. Fig. 2 is a similar view of the stock and the cutter and reamer separated, and Fig. 3 is a longitudinal section of the same.

Similar letters of reference indicate corresponding parts in all the figures.

My invention has relation to cutters and reamers for cutting holes in the flue-sheets of a boiler; and it consists in the improved construction and combination of parts of such a tool, which will cut the hole and ream its edges at the same time, and provided with a yielding center-pin or spindle which will guide the cutter without the necessity of drilling a hole in the sheet for the pin guiding the cutter, as is necessary in cutters as they are generally constructed, as will hereinafter be more fully described and claimed.

In the accompanying drawings, the letter A indicates the stock, the outer portion of which is hollow, as shown at B, and a spring, C, is inclosed in the said hollow or recess, bearing against the bottom of the same with its inner end, and bearing with its outer end against the shouldered inner end, D, of the center-pin E. The outer reduced end, F, slides in a central perforation, G, of a collar, H, which is screwed with its reduced threaded end into the threaded end of the bore or recess, retaining the pin in its place, allowing it to be forced inward, but preventing it from being forced out by the spring. The outer hollow portion of the stock is provided at a distance from the end with a collar or shoulder, I, and a short distance above the collar with two diametrically-opposite pins, J, and a sleeve, K, the outer end of which is serrated or cut to form cutter-teeth L, fits upon the end of the stock, bearing with its inner end against the collar, and has at its inner end two L-shaped slots, M, which are slipped over the pins, allowing the screws to enter the inner ends of the slots M by turning the sleeve upon the stock, preventing the sleeve from slipping off the stock. A collar, N, fits upon the sleeve, and may be secured upon the same by means of a set-screw, O, and the outer end of this collar is beveled and serrated to form reamer-teeth, as shown at P, having sharp cutting-edges facing in the direction of the rotation of the cutter.

It will be seen that the cutter-sleeve may be secured upon the stock, and the reamer-collar adjusted upon the sleeve to suit the thickness of the sheet and the depth to which it is desired to ream the hole made by the cutter, and by bearing the end of the centering-pin which forms a sharp point against the sheet the cutter will cut the hole, and the reamer at the same time cut away the burrs upon the edges of the same by revolving the stock, thus avoiding the necessity of drilling a hole for the centering-pin, which recedes into the hollow end of the stock as the cutter progresses, and avoiding the necessity of reaming the hole after it has been cut, doing both operations at once.

Having thus described my invention, I claim and desire to secure by Letters Patent of the United States—

In a cutter and reamer for flue-sheets, the combination of the stock having its outer end hollow, forming a bore having its outer end female threaded, provided with a collar or shoulder a distance from its end, and provided with two pins or lugs, a spring bearing against the bottom of the bore, a collar fitting with its reduced threaded end in the threaded outer end of the bore, and having a central perforation, a centering-pin sliding with its outer reduced and pointed end in the perforation of the collar, and bearing with its inner end against the outer end of the spring, a cutter-sleeve forming cutter-teeth at its outer end, and having two L-shaped slots at its lower end fitting over the pins upon the stock, and a collar having its outer edge beveled and provided with reamer-teeth, and secured upon the sleeve by means of a set-screw, as and for the purpose shown and set forth.

In testimony that I claim the foregoing as my own I have hereunto affixed my signature in presence of two witnesses.

ELDON BROWN HUNT.

Witnesses:
SYDNEY P. TOGWILL,
JESSE E. WILLIAMS.